United States Patent [19]
Stigall et al.

[11] 3,916,234
[45] Oct. 28, 1975

[54] VEHICLE WHEEL SPEED SENSOR

[75] Inventors: Donald R. Stigall, Glendale; Richard C. Bueler, Des Peres, both of Mo.

[73] Assignee: Wagner Electric Corporation, Parsippany, N.J.

[22] Filed: June 19, 1974

[21] Appl. No.: 480,864

Related U.S. Application Data
[63] Continuation of Ser. No. 363,604, May 24, 1973.

[52] U.S. Cl. ............................ 310/155; 310/168
[51] Int. Cl.² ................................ H02K 21/38
[58] Field of Search ..................... 310/168–171, 310/155, 154, 111; 329/179

[56] References Cited
UNITED STATES PATENTS

| | | | |
|---|---|---|---|
| 2,756,357 | 7/1956 | Schaberg | 310/168 |
| 3,317,765 | 5/1967 | Cone | 310/155 X |
| 3,710,158 | 1/1973 | Bachle et al. | 310/168 X |
| 3,760,210 | 9/1973 | Abate | 310/168 |
| 3,764,837 | 10/1973 | Burckhardt et al. | 310/168 |

Primary Examiner—Donovan F. Duggan

[57] ABSTRACT

In a vehicle having an axle, a wheel rotatable on the axle, a bearing for the wheel, a nut threaded on the end of the axle for retaining the bearing in place, and a hub cap for the wheel enclosing a chamber holding lubricant for the bearing; means in the chamber for sensing wheel speed having nut carried means fixed with respect to the wheel and hub cap carried means rotatably with the wheel for generating an electrical signal in response to wheel rotation. The disclosure also includes a sensor for an antilock brake system having means providing a magnetic field, a rotor operable therein, and a substantially annular ferrous ladder in said rotor providing a varying reluctance path for the magnetic field thereby to create an electrical signal. A sensor is also disclosed for an antilock brake system having a rotor, a stator having a mounting ring, pole pieces in said mounting ring, and means engaged with the pole pieces for predeterminately locating them circumferentially and axially of the ring.

12 Claims, 8 Drawing Figures

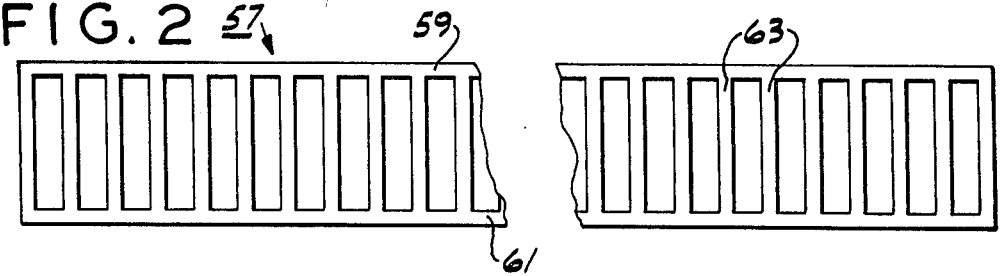
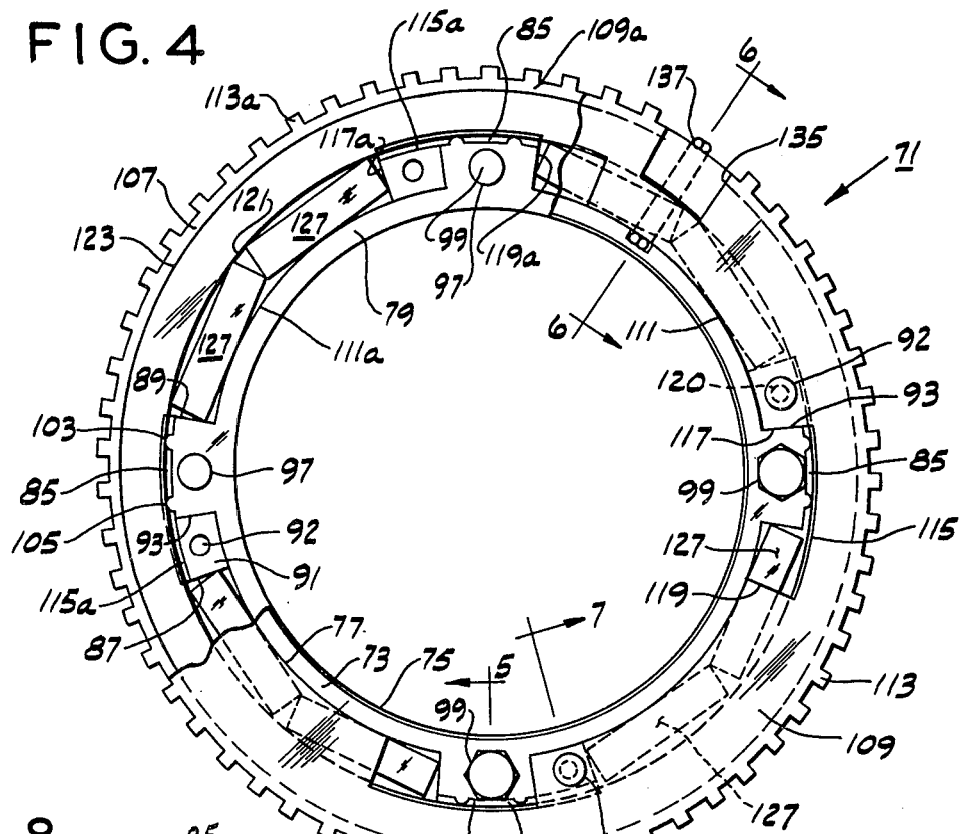
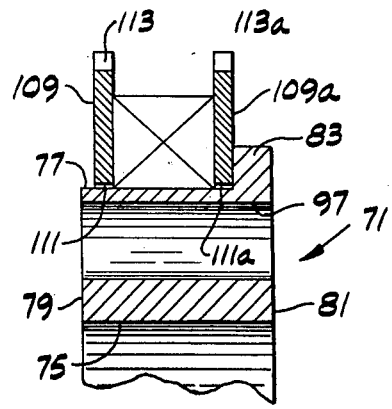
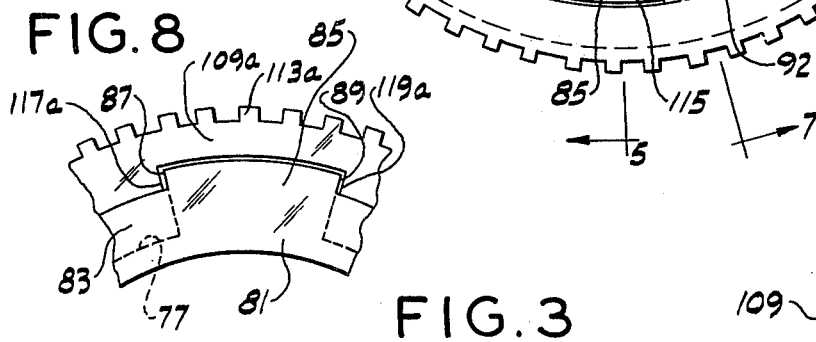
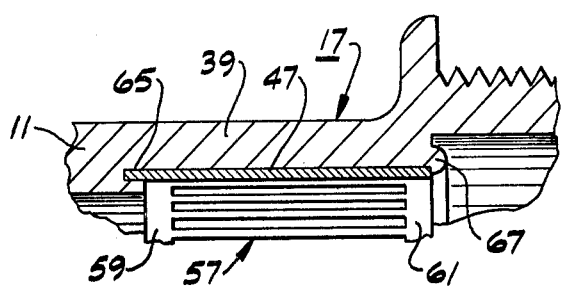

VEHICLE WHEEL SPEED SENSOR

This application is a continuation of Application Ser. No. 363,604, filed May 24, 1973.

BACKGROUND OF THE INVENTION

This invention relates generally to vehicle wheel speed sensors and in particular to those used in brake antilock systems.

In the past, there have been various types of electrical sensors for monitoring vehicle wheel speed in antilock brake systems to detect an incipient wheel-skid situation. For instance, U.S. Pat. No. 3,500,091 discloses a sensor which is mounted on the inboard side of a vehicle wheel, and the sensor includes an annular electrical coil positioned adjacent both an annular magnet and a pole piece which are arranged concentrically with each other. While this sensor has certain advantages, it is subjected to dirt, slush and other foreign particles which may be splashed or thrown thereon from the roadbed.

U.S. Pat. No. 3,473,120 discloses a sensor for a vehicle antilock brake system mounted in a wheel bearing lubrication chamber on the outboard side of the vehicle wheel, and the sensor rotor is mounted on the hub cap assembly while the sensor stator is housed generally within the bore of a hollow axle. While this sensor has certain advantages, the mounting of its stator within the hollow axle serves to either appreciably reduce the number of stator teeth or the size thereof, to either limit the number of flux paths or reduce the size of the cumulative flux paths, to reduce the strength of the output signal of the sensor, or to make the stator-rotor gap more critical. U.S. Pat. Nos. 2,798,976, 3,480,812 and 2,462,761 each show signal generating devices and illustrate various arrangements of the rotor and stator thereof.

SUMMARY OF THE INVENTION

Among the several objects of the present invention may be noted the provision of a sensor having a high signal output; the provision of a sensor wherein the tolerance or gap between the sensor rotor and stator are not critical; the provision of a sensor having magnet means mechanically maintained in the intimate contact with the sensor pole pieces; the provision of a sensor wherein the tolerance gap between the sensor stator and rotor, if small at one location while greater at another location, is averaged due to the use of a plurality of individual flux paths which serve to minimize extraneous modulation; the provision of a sensor in which the stator thereof has identical pole pieces; the provision of a sensor having a stator in which the component parts thereof are all referenced and self-aligning; the provision of a sensor which is operable in the environment of lubricant for the vehicle wheel bearing; the provision of a sensor which may be cooperably mounted on vehicle hub caps and bearings retaining nut which are staple articles with only a minimum of alteration thereof; and the provision of a sensor having a varying reluctance path providing means stamped from sheet metal and formed annularly wherein the thickness thereof is substantially constant. Other objects and features will be in part apparent and in part pointed out hereinafter.

In general, the invention is used in a vehicle having an axle, a wheel rotatable on the axle, a bearing for the wheel, a nut threaded on the end of the axle for retaining the bearing in place, and a hub cap for the wheel enclosing a chamber holding lubricant for the bearing; means in the chamber for sensing wheel speed comprising means carried by the nut and fixed with respect to the wheel, and means carried by the hub cap and rotatable with the wheel for generating an electrical signal in response to rotation of the wheel. Also, a sensor of this invention for an antilock brake system comprises means providing a magnetic field, a rotor operable in the magnetic field, and a substantially annular ferrous ladder in said rotor providing a varying reluctance path for the magnetic field thereby to generate an electrical signal. In addition, a sensor of this invention for an antilock brake system comprises a rotor, a stator having a mounting ring, a pair of pole pieces mounted on the ring, and means engaged with the pole pieces for predeterminately locating them with respect to each other both circumferentially and axially of the ring.

BRIEF DESCRIPTION OF THE DRAWINGS

FIG. 2 is a developed view of a ferrous ladder for use in the sensor rotor of the present invention;

FIG. 3 is an enlarged fragmentary view taken from FIG. 1 and illustrating the means for mounting the ferrous ladder in the sensor rotor;

FIG. 4 is an end elevation of the sensor stator partially broken away;

FIG. 5 is an enlarged fragmentary view taken on line 5—5 of FIG. 4;

FIG. 8 is a fragmentary end elevation of the sensor stator.

Corresponding reference characters indicate corresponding parts throughout the several view of the drawings.

DESCRIPTION OF THE PREFERRED EMBODIMENT

Figure 1:
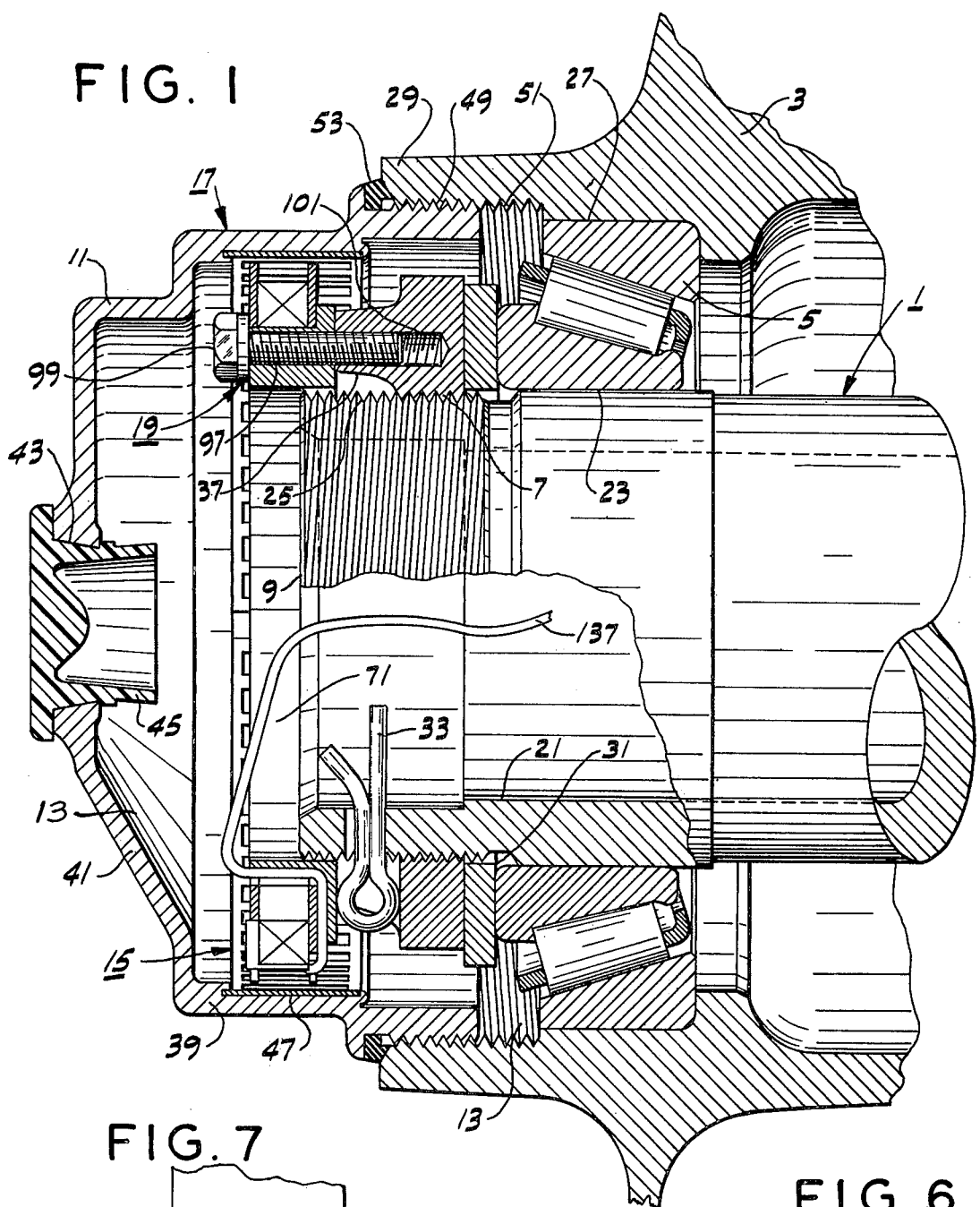
FIG. 1 is a partial sectional view illustrating an electrical sensor of the present invention.

Referring now to the drawings in detail and in particular to FIG. 1, there is shown generally at 1 an axle for a vehicle rotatably mounting a vehicle wheel 3. A wheel bearing 5 is disposed between wheel 3 and axle 1, and a wheel bearing retaining nut 7 is threadably received on a free end portion 9 of the axle for retaining the bearing in place. A hub cap 11 is engaged with wheel 3 enclosing lubricating chamber 13 which holds lubricant for bearing 5. An electrical sensor 15, for generating an electrical signal to control actuation of a vehicle antilock brake system or the like (not shown), is provided with a rotor 17 which constitutes hub cap 11 and associated component parts, as described hereinafter, and a stator 19 carried by nut 7 which also retains in place bearing 5, as previously mentioned.

More particularly, axle 1 is hollow, having an axially extending bore 21 which opens into the free end portion 9 of the axle, and a peripheral surface 23 of axle free end portion 9 is threaded at 25. Antifriction or wheel bearing 5, of a type well known in the art, is rotatably positioned in engagement between axle peripheral surface 23 and a cooperating annular surface 27 on wheel hub 29. Bearing retaining nut 7 is threadably received on axle threads 25 and engaged with a spacer washer or shim 31 to maintain the bearing in place. The interfering engagement of a cotter key 33 between axle 1 and adjacent nut extensions 37 maintains the nut 7 in its assembled position on axle threads 25.

Hub cap 11, which is a type well known in the art and formed of either a nonferrous metal or a plastic, is generally cup-shaped having an annular side wall 39 integral with a base wall 41. A lubricant filler hole 43 is centrally provided in the base wall in which an insertable bayonet sealing plug 45 is received. Axially extending bore 47 is provided in hub cap side wall 39 as discussed hereinafter, and peripheral threads 49 are provided in the hub cap side wall 39 for threaded engagement with cooperating thread 51 provided in the leftward or open end of wheel hub 29. An O-ring type seal 53 is carried on hub cap side wall 39 in sealing engagement with wheel hub 29 to seal lubrication chamber 13.

Referring now to FIG. 2, a ferrous ladder or track 57 stamped from substantially planar ferrous metal sheets is shown in its free form having opposite generally parallel side rails or strips 59, 61 with a plurality of predeterminately spaced ribs or ties 63 integrally formed between the side strips and generally normal thereto. Ribs 63 are generally coplanar with side rails 59, 61 of ferrous ladder 56, and do not protrude, but the ribs are similar to teeth-like portions and define individual teeth-like strips. Ferrous ladder 57 is purposely formed from strip material so that ribs 63 thereof do not protrude radially inwardly, as did the teeth of prior art rotors, thereby to conserve space or effect the maximum utilization of minimal space within the wheel bearing lubrication chamber 13. Ferrous ladder 57 is cut in predetermined lengths, shaped generally to an annular form with opposite ends thereof abutted to form a substantially continuous rotor piece or reluctance path for sensor 15, and ladder 57 is then positioned about bore 47 of the hub cap 11. In FIG. 3, an annular slot or undercut 65 is provided in hub cap side wall 39 adjacent bore 47 in which one ferrous ladder side rail 59 is positioned, and a portion of hub cap side wall 39 is swagged or rolled at 67 over side rail 61 to maintain ferrous ladder 57 in its assembled position about bore 47 of hub cap side wall 39. When disposed in hub cap 11, ferrous ladder 57 in its annular form has a thickness which is substantially constant throughout its axial expanse, i.e., side rails 59 and ribs 63 have substantially constant thicknesses. Of course, ferrous ladder 57 could also be retained in the hub cap bore 47 by other suitable positioning means, such as rivets, an epoxy resin, a glue, providing a plastic case for the ferrous ladder which can be maintained in place in bore 47, or providing a ladder which can be press-fitted in bore 47.

Referring now to FIGS. 1 and 4–8, sensor 15 is also provided with a stator assembly 71 having a generally annular support or mounting ring 73 of nonferrous metal or other nonmagnetic or a synthetic material, and ring 73 is provided with radially inner and outer circumferential or annular surfaces 75, 77 integrally formed between generally radially extending opposite sides 79, 81. Inner surface 75 is received on peripheral surface 23 of axle 1 adjacent its free end 9, and a radially outwardly extending flange or retainer 83 is integrally formed and substantially coextensive with ring side 81, said ring side and flange 81, 83 being positioned in abutting engagement with extensions 37 of nut 7. Positioning or locating bosses 85 are integrally formed on outer annular surface 77 of ring 73 extending between sides 79, 81 thereof, and opposite locating edges or faces 87, 89 are provided on bosses 85 extending in imaginary planes which are generally normal to ring sides 79, 81 and surfaces 75, 77 extending through the center of the ring 73. Although bosses 85 are generally keystone-shaped, other configurations are also contemplated. Bosses 85 are stepped to form a locating surface 91 substantially parallel to flange 83 and predeterminately spaced from the ring side 79, and locating nipples or hubs 92 are integrally formed substantially normal to surfaces 91. Another locating edge or face 93 is defined on bosses 85 between locating surface 91 and ring side 79 and extending in an imaginary plane normal to the ring sides 79, 81 and extending through the center of ring 73. Bores 97 are provided through bosses 85 and flange 83, and stator mounting means, such as studs 99, extend through bores 97 being threadably received in cooperating aligned threaded bores 101 provided in nut extensions 37 thereby to mount the ring 73 in fixed engagement with nut 7. In this manner, nut 7 not only retains bearing 5 in place but also carries or provides a mount for stator 71. Radially extending positioning or locating ribs or extensions 103, 105 are provided on the peripheral surfaces of bosses 85 for positioning or locating engagement with an annular or toroidal stator coil 107, as discussed hereinafter.

Stator 71 is provided with identical annular and generally planar pole pieces 109, 109a which are stamped from flat steel stock. Inner circumferential surfaces 111, 111a of pole pieces 109, 109a are sized to slidably engage ring outer surface 77, and a plurality of predeterminately circumferentially spaced teeth, 113, 113a are provided in the outer circumference of pole pieces 109, 109a, respectively. Keyway-shaped slots 115, 115a are provided through pole pieces 109, 109a intersecting with inner surfaces 111, 111a, and the keyway slots are provided with opposed locating edges or sides 117, 119 and 117a, 119a. Axially extending locating holes 120, 120a are provided in pole pieces 109, 109a, and holes 120 in pole piece 109 are engageable with the ring nipples 92, as discussed hereinafter.

Figure 7:
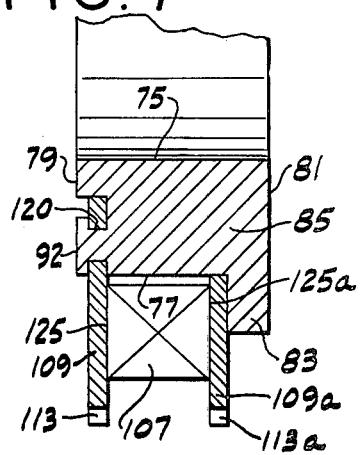
FIG. 7 is an enlarged fragmentary view taken on line 7—7 of FIG. 4.
Figure 6:
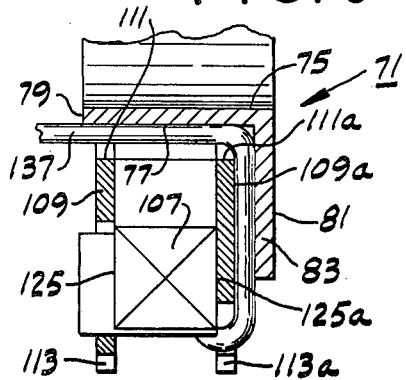
FIG. 6 is an enlarged fragmentary view taken on line 6—6 of FIG. 4.

In the assembly of stator 71, pole piece 109a is positioned on ring 73 with its inner surface 111a received on ring surface 77 and with its keyway surfaces 117a, 119a in locating engagement with cooperating locating surfaces 87, 89 of ring locating bosses 85. Pole piece 109a is also engaged with ring flange 83 which not only serves to locate the pole piece but also retains or holds the pole piece on ring 73. Electrical annular coil 107 is provided with an inner circumferential surface 121 which is received in locating engagement on ribs 103, 105 of bosses 85, and outer circumferential surface 123 of coil 107 is positioned or terminates adjacent pole piece teeth 113, 113a. Opposite annular sides 125, 125a of coil 107 are adapted for engagement with pole pieces 109, 109a, and a plurality of permanent magnets 127 are disposed in generally circumferentially extending spaces defined between bosses 85 and between coil inner surface 121 and ring outer surface 77, said magnets being in end-to-end relation and extending generally circumferentially about the stator 71. As well known in the art, magnets 127 are disposed with all of their north and south poles respectively adjacent to pole pieces 109, 109a to provide like polarity therein. Pole piece 109 is placed on ring 73 with pole piece locating edges 117 in locating engagement with locating face 93 of bosses 85, and the interior side of the pole piece is in locating engagement with stepped surfaces 91 of the bosses. As shown in FIG. 7, holes 120 in pole piece 109 are received on ring nipples 92 when pole piece 109 is seated on locating surface 91, and nipples 92 are riveted over pole piece 109 to fixedly attach it to ring 73. It should be noted that the width of magnets 127 is slightly greater than the predetermined distance between ring flange 83 and stepped surfaces 91 so that pole pieces 109, 109a are mounted or pulled down into intimate contact with the magnets upon the assembly of the stator 71 thereby to provide a lower reluctance path and a greater output signal, as discussed hereinafter. To complete the description of the preferred embodiment, pole pieces 109, 109a are provided with grooves 135, 135a in the outer peripheral edges thereof interrupting the continuity of teeth 113, 113a, and electrical leads 137 of coil 107 are led out of lubrication chamber 13 through bore 21 of hollow axle 1 for connection to the logic portion of an antilock brake system or the like (not shown). It should also be noted that the circumferential spacing and number of teeth 113, 113a in stator pole pieces 109, 109a correspond to the circumferential spacing and number of ribs 63 provided on ferrous ladder 57, and ferrous ladder 57 and hub cap 11 constitute rotor 17 for cooperation with the stator 71. From the foregoing it is apparent that the sensor 15 is mounted outboard of the vehicle wheel 3 and as close as possible thereto for monitoring wheel speed, and the mounting of stator 71 within the lubrication chamber 13 and on nut 7 effects maximum utilization of minimal space, as does the use of hub cap 11 as a rotor component. The use of a plurality of magnets 127 provides a strong magnetic field, if the tolerance gap between rotor and stator 71 is small at one location and greater at another location, such gap variation is averaged due to the utilization of a plurality of individual flux paths which serve to minimize extraneous modulation.

With the component parts assembled as described hereinabove, it is apparent that magnets 127 are a means for providing a magnetic field, and operation of the vehicle effects rotation of wheel 3 on bearing 5 relative to axle 1 causing ribs 63 of ferrous ladder 57 to be continuously rotated into and out of radial alignment with stator pole piece teeth 113, 113a. Ferrous ladder ribs 63, stator teeth 113, 113a, pole pieces 109, 109a and coil 107 constitute means for providing a varying reluctance path, and when ferrous ladder ribs 63 are radially aligned with the stator teeth 113, 113a, the gap therebetween is less than when the ferrous ladder ribs and corresponding stator teeth are radially misaligned. In this manner, rotation of hub cap 11 acts to continually vary the gap between ferrous ladder ribs 63 and stator teeth 113, 113a thereby to effect a low and high reluctance path for the magnetic field when ferrous ladder ribs 63 are respectively in radial alignment and misalignment with the stator teeth. The continual varying of the gap between ferrous ladder ribs 63 and stator teeth 113, 113a in the magnetic field created by the magnets 127 serves to generate a varying electrical signal; and, coil 107 and leads 137 constitute means for producing the electrical signal which is correlative of the wheel speed and transmitted to the logic portions of an antilock brake system (not shown).

In view of the above, it will be seen that the several objects of the invention are achieved and other advantageous results attained.

As various changes could be made in the above products without departing from the scope of the invention, it is intended that all matter contained in the above description or shown in the accompanying drawings shall be interpreted as illustrative and not in a limiting sense.

We claim:

1. In a vehicle having an axle, a wheel rotatable on the axle, a bearing for the wheel, a nut threaded on the end of the axle for retaining the bearing in place, a hub cap for the wheel enclosing a chamber holding lubricant for the bearing;

means in the chamber for sensing wheel speed comprising:
 a. means radially annularly disposed relative to the axle carried by the nut and fixed with respect to the wheel; and
 b. means mounted in the hub cap radially annularly disposed about and aligned with the means carried by the nut and rotatable with the wheel for generating an electrical signal in response to rotation of the wheel.

2. In a vehicle having an axle, a wheel rotatable on the axle, a bearing for the wheel, a nut threaded on the end of the axle for retaining the bearing in place, a hub cap for the wheel enclosing a chamber holding lubricant for the bearing:

means in the chamber for sensing wheel speed comprising:
 a. means radially annularly disposed relative to the axle carried by the nut and fixed with respect to the wheel;
 b. means mounted in the hub cap radially annularly disposed about and aligned with the means carried by the nut and rotatable with the wheel for generating an electrical signal in response to rotation of the wheel;
 the nut carried means having means providing a magnetic field for generation of an electrical signal;
 d. the hub cap carried means having means providing a portion of a varying reluctance path for the magnetic field upon wheel rotation;
 e. the nut carried means having means providing another portion of the varying reluctance path for the magnetic field upon wheel rotation; and
 f. the nut carried means having coil means in the magnetic field for producing an electrical signal in response to movement of the magnetic field relative to the varying reluctance of the path.

3. In a vehicle according to claim 2, the nut carried means comprising a stator and the hub cap carried means comprising a rotor.

4. In a vehicle according to claim 3, the rotor and the stator each having a plurality of teeth-like means extending at least partially and generally circumferentially thereof and located in close tolerance relation with each other, the teeth-like means of the rotor and stator comprising the varying reluctance path providing means.

5. In a vehicle according to claim 4, the hub cap having a bore therein substantially coaxial with the axle, and the rotor teeth-like means being mounted in the bore.

6. In a vehicle according to claim 5, the rotor having a like pair of axially spaced annular side rails disposed in the bore in displacement preventing engagement with the hub cap and a plurality of ribs formed between the side rails, the ribs constituting the rotor teeth-like means.

7. In a vehicle according to claim 5, the rotor comprising a hub cap for a vehicle wheel and having a substantially annular nonferrous portion, and a ladder of substantially flat ferrous strip material constructed to conform generally with at least part of the annular portion, said ladder including opposite like side rails predeterminately spaced from each other, means for attaching the side rails to the annular portion, a plurality of ribs between the side rails and defining therewith a varying reluctance path for a magnetic field, the ribs being predeterminately circumferentially spaced from each other, and voids defined between the side rails and the adjacent ribs.

8. In a vehicle according to claim 4, the stator having a non-ferrous ring secured to the nut and extending about the axle, a pair of annular pole pieces mounted on the ring and extending generally radially thereof toward the rotor, the stator teeth-like means being provided in the outer circumferential edges of each pole piece, the coil means being disposed between the pole pieces adjacent the stator teeth-like means, and magnet means having alternate polarity and being disposed radially about the ring and surrounded by the coil, the magnet means being in intimate contact between the pole pieces.

9. In a vehicle according to claim 3, the stator having a toothed portion, the rotor having an annular ferrous ladder with opposed like side strips and a plurality of ribs therebetween, the ribs being located in close tolerance relation with the teeth of the stator toothed portion, the stator and its toothed portion and the rotor and its ferrous ladder constituting the varying reluctance path providing means.

10. In a vehicle having an axle, a wheel rotatable on the axle, a bearing for the wheel, a nut threaded on the end of the axle for retaining the bearing in place, a hub cap for the wheel enclosing a chamber holding lubricant for the bearing:

means in the chamber for sensing wheel speed comprising:
a. an annular stator assembly carried by the nut and radially disposed about the axle, the stator assembly comprising:
   1. an annular stator ring;
   2. magnets annularly disposed about the ring;
   3. an annular coil radially disposed about the magnets; and
   4. annular pole pieces mounted on the ring and radially extending therefrom respectively abutting the magnets and spaced thereby; and
b. an annular rotor including a portion mounted in the hub cap radially disposed about and aligned with the stator and rotatable thereabout with the wheel.

11. The vehicle of claim 10, wherein the rotor comprises:
a. a hub cap having a substantially annular nonferrous portion; and
b. a ladder of substantially flat ferrous strip material conforming generally with at least a part of the annular nonferrous portion, the ladder including opposite like side rails predeterminately spaced from each other, means for attaching the side rails to the annular portion, and a plurality of ribs spacing and interconnecting the side rails.

12. The vehicle of claim 11, wherein the pole pieces have tooth like portions formed on the radial extremeties thereof.

* * * * *